(12) United States Patent
Gordon

(10) Patent No.: US 6,645,341 B1
(45) Date of Patent: Nov. 11, 2003

(54) TWO PART EPOXIDE ADHESIVE WITH IMPROVED STRENGTH

(75) Inventor: Terry Gordon, Southampton (GB)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/213,883

(22) Filed: Aug. 6, 2002

(51) Int. Cl.[7] .............................................. C09J 109/02
(52) U.S. Cl. ................... 156/330; 156/331.6; 156/332; 156/335; 428/413; 523/466; 525/65; 525/99; 525/109; 525/113; 525/122; 525/132; 525/533
(58) Field of Search ............................. 156/330, 331.6, 156/332, 335; 428/413; 523/466; 525/65, 99, 109, 113, 122, 132, 529, 532, 533

(56) References Cited

U.S. PATENT DOCUMENTS

| 4,447,579 A | | 5/1984 | Takagi et al. | |
|---|---|---|---|---|
| 4,746,381 A | * | 5/1988 | Parker | 156/69 |
| 5,575,956 A | | 11/1996 | Hermansen et al. | |
| 5,929,141 A | | 7/1999 | Lau et al. | |

FOREIGN PATENT DOCUMENTS

| EP | 0 169 066 | 1/1986 |
|---|---|---|
| EP | 301720 | 2/1989 |
| EP | 0 375 874 | 7/1990 |
| EP | 596622 | 5/1994 |
| WO | WO 91/17213 | 11/1991 |

OTHER PUBLICATIONS

Schiffauer et al.: "Novel High Load Polymer Polyol Technology for Improved Fatigue and Processing"; Proceedings of the Polyurethanes World Congress, Oct. 1993; The Society of the Plastics Industry, Inc. NY, NY; 1993.

* cited by examiner

Primary Examiner—Robert Dawson
Assistant Examiner—D. Aylward
(74) Attorney, Agent, or Firm—Charles W. Almer

(57) ABSTRACT

A two-component epoxy-based adhesive comprising a resin component and a curing agent. The resin component comprises an epoxy resin, a polymer polyol, and fumed silica. The curing agent comprises a polyoxyalkyleneamine, an amine terminated butadiene-acrylonitrile polymer, tris(2,4, 6-dimethlaminomethyl)phenol, polyamide resin, silane and fumed silica. The adhesive composition is particular useful for bonding of metals, plastics and composites and for functions such as laminating, honeycomb bonding, automotive assembly and construction assembly.

21 Claims, No Drawings

TWO PART EPOXIDE ADHESIVE WITH IMPROVED STRENGTH

FIELD OF THE INVENTION

The present invention relates to compositions used as adhesives, and in particular to two-part epoxide adhesive compositions having improved peel and shear strength.

BACKGROUND OF THE INVENTION

Epoxy-based adhesives are utilized for providing high quality, permanent bonding in many different commercial and industrial settings. Epoxy-based adhesives are especially useful for their ability to strongly adhere to a variety of materials, including metal, glass, plastic, wood and fiber. Consequently, these adhesives are often used to bond dissimilar materials together. Epoxy-based adhesives also provide the benefit of excellent resistance to attack by many corrosive chemicals. Because of these properties, these adhesives are often utilized in place of metal solder which, in contrast to epoxy, may contain toxic metals and require fluxing.

Two forms of epoxy-based adhesive compositions are commonly commercially available. The first form, one-component adhesives, are available as rigid epoxy adhesives, frozen pre-mix flexible epoxy adhesives, and room-temperature stable flexible epoxy adhesives. While one-component compositions provide the convenience of storage as a single component, they also require elevated curing temperatures. The second form of adhesive, two-component adhesives, are stored as two separate components that are mixed prior to application on the surfaces to be bonded together. Two-component adhesives overcome the often inconvenient curing requirements of one-component adhesives in that two-component adhesives are curable at room temperature.

Two critical measurements of adhesives are peel strength and shear strength. Generally, epoxy adhesives are brittle materials that fail when subjected to peel forces. Thus, epoxy adhesives are unsuitable for applications that require the adhesives to be subjected to damaging external forces. Consequently, there is a need in the art for the development of an epoxy adhesive having improved peel and shear strength which would provide resilient bonds when subjected to external forces. Such adhesives would advantageously include additives to provide the adhesive with the ability to withstand peel forces and increase the shear strength of the adhesive, but would not require the adhesive to be cured at high temperatures.

SUMMARY OF THE INVENTION

The present invention discloses a two-component epoxy-based adhesive comprising a resin component and a curing agent component. The resin component comprises an epoxy resin, a toughener that is preferably a polymer polyol and, optionally, fumed silica. The curing agent comprises a polyoxyalkyleneamine, an amine terminated butadiene-acrylonitrile polymer, tertiary amine, polyamide resin, silane and fumed silica. The adhesive composition is particularly useful for bonding of metals, plastics and composites and for functions such as laminating, honeycomb bonding, automotive assembly and construction assembly.

Another embodiment of the invention is directed to a method for bonding materials together which comprises applying the adhesive composition of the invention in a liquid or paste form to a first substrate, bringing a second substrate in contact with the composition applied to the first substrate, and subjecting the applied composition to conditions which will allow the composition to cure to an irreversible solid form. Still another aspect of the invention is directed to an article of manufacture comprising the adhesive of the invention.

DETAILED DESCRIPTION OF THE INVENTION

The two-component epoxy-based adhesive of the present invention comprises resin and curing agent components. The resin component comprises an epoxy component, one or more polymer polyols and, optionally, fumed silica.

Examples of epoxy resins suitable for use in the present adhesive composition include monofunctional and multifunctional glycidyl ethers of Bisphenol-A and Bisphenol-F, and cycloaliphatic epoxy resins or a combination thereof. The cycloaliphatic epoxides are preferably selected from non-glycidyl ether epoxides containing more than one 1.2 epoxy group per molecule. These epoxides are characterized by a ring structure wherein the epoxide group may be part of the ring or may be attached to the ring structure. Examples of non-glycidyl ether epoxides include 3,4-epoxycyclohexylmethyl-3,4-epoxycyclohexane carboxylate, which contains two epoxide groups that are part of the ring structures and an ester linkage, vinylcyclohexene dioxide, which contains two epoxide groups and one of which is part of the ring structure, 3,4-epoxy-6-methyl cyclohexyl methyl-3,4-epoxycyclohexane carboxylate and dicyclopentadiene dioxide.

Glycidyl ether epoxides are preferred in the invention, either separately or in combination with the non-glycidyl ether epoxides. These resins are selected from glycidyl ether epoxides containing more than one 1.2 epoxy group per molecule. A preferred epoxy resin of this type is Bisphenol A resin. Preferred Bisphenol A type resin includes 2,2-bis(4-hydroxyphenyl) propane-epichlorohydrin copolymer. A further preferred epoxy resin is Bisphenol F type resin. These resins are generally prepared by the reaction of one mole of bisphenol F resin and two moles of epichlorohydrin. A further preferred type of epoxy resin is epoxy novolac resin. Epoxy novolac resin is commonly prepared by the reaction of phenolic resin and epichlorohydrin. A preferred epoxy novolac resin is poly(phenyl glycidyl ether)-co-formaldehyde. Biphenyl type epoxy resin may also be utilized in the present invention. This type of resin is commonly prepared by the reaction of biphenyl resin and epichlorohydrin. Dicyclopentadiene-phenol epoxy resin, naphthalene resins, epoxy functional butadiene acrylonitrile copolymers, epoxy functional polydimethyl siloxane and mixtures thereof are additional types of epoxy resins which may be employed. The preferred epoxy for the adhesive of the present invention is a blend of Bisphenol F type resin and Bisphenol A type resin, commercially available from Vantico as ARALDITE PY720. Other suitable Bisphenol A/F blends commercially available include EPIKOTE 235, 234 and 238 (Shell), NPEF 185, 198 and 187 (Whyte Chemicals), DER 351, 356 and 352 (Dow), or RUTAPOX 0169 or 0166 (Bakelite). Bisphenol F type resin is available from CVC Specialty Chemicals under the designation 8230E, EPIKOTE 862 (Resolution), or Whyte Chemicals as NPEF 170. Bisphenol-A type resin is commercially available from Resolution Technology as EPON 828, 828EL or 828XA. The epoxy resin component of the resin comprises from about 50 to about 90 weight percent of the resin component and, preferably, about 75 to about 85 weight percent of the resin component.

The toughener segment of the resin component is preferably a polyol and most preferably a polyester or polyether polyol. Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl) propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include CP4701 (Dow Chemicals), NIAX 11-34 (Union Carbide Corp), Desmophen 3900 (Bayer), Propylan M12 (Lankro Chemicals), Highflex 303 (Daiichi Kogyo Seiyaku K.K.) and Daltocel T 32-75 (ICI). "Polymer polyols" are also suitable, e.g., graft polyols containing a proportion of rubber copolymers, polymerized in situ, e.g., NIAX 34-28 (Union Carbide Corp.), Caradol MD32-04 (Shell), Desmophen 1920D and Arcol 1366 (Bayer).

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4, cyclohexanediol-1,4, 1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

Commercially available polyols which may be used in the practice of the invention include polyethers such as ARCOL PPG 2025 (Bayer), PolyG 20-56 (Arch) and Pluracol P-2010 (BASF), polyesters such as Dynacoll 7360 (Creanova), Fomrez 66-32 (Crompton) and Rucoflex S-105-30 (Bayer) and polybutadiene such as Poly BD R-45HTLO (Elf Atochem). A most preferred polyol is polyoxypropylene/polyoxyethylene non-reactive styrene acrylonitrile polymer polyol (ARCOL HS100; Bayer). Additional preferred polyols are STEPANPOL, commercially available from Stepan Company, polybutadiene resin (Poly BD 600 and 605), and polytetramethylene ether glycol molecular weight 1000 and 2000 (TERATHANE 1000 and 2000). Other materials that may be utilized as tougheners include acrylate monomers, such as epoxidized soya bean acrylate (CN111; Cray Valley) and dipropylene glycol diacrylate (SR508; Cray Valley). The toughener segment of the resin component comprises from about 10 to about 40 weight percent of the resin component and, preferably, about 10 to about 20 weight percent of the resin component.

The final ingredient in the resin component is silica which provides non-slump properties to the material. While the adhesive may be formulated without silica, its absence will result in a material that will have a very low viscosity and thus could flow out of the joints during application and curing, thus leaving very little of the adhesive to bond the surfaces. Preferably the silica is hydrophobic fumed silica, such as is commercially available from Cabot as CABOSIL TS-720 or from Degussa as AEROSIL R202. The silica segment of the resin component comprises from about 0 to about 10 weight percent of the resin and, preferably, about 0 to about 5 weight percent of the resin component.

The curing agent component of the adhesive composition includes an amine component. Among the various types of amine that may be useful are one or more of polyether urethane amine, amino polyamide, polyether polyamine, dimethylaminopropylamine, and polyaminoimidazoline resin. Among the commercially available forms of these amines are EUREDUR 70, EUREDUR 75, EUREDUR 140, EUREDUR 145, EUREDUR 76 (available from Vantico under the ARADUR tradename) and CRAYAMID 125 (Cray Valley). A most preferred form of amine is polyoxyalkyleneamine of molecular weight 230, commercially available as JEFFAMINE D230 (Huntsman). The amine component of the curing agent comprises about 20 to about 100 wt % of the curing agent, and is preferably about 40 to about 80 wt % of the curing agent.

A further component of the curing agent is an amine terminated butadiene-acrylonitrile (ATBN) polymer, such as HYCAR ATBN 1300×16 (Noveon). The ATBN component of the curing agent comprises about 0 to about 30 wt % of the curing agent, and is preferably 10 to about 20 wt % of the curing agent.

A phenolic accelerator component is also included in the curing agent. A most preferred phenol is tris(2,4,6-dimnethylaminomethyl)phenol (Curing Agent K54 (Air Products)), Permacure 213 (Whyte Chemicals), or ARADUR 13 (Vantico). Additional components of the curing agent include a polyamide resin based on dimerised fatty acid and polyamine (CRAYAMID 125 (Cray Valley)), Permacure 505 (Whyte Chemicals), Andamide 220 (Air Products), gamma-Aminopropyltriethyoxy silane (A1100 (OSi Specialties)), Dynasylan AMEO (Degussa-Huils Sivento) and A0750 (UCT), and hydrophobic fumed silica (CABOSIL TS-720 (Cabot)) and Aerosil R202 (Degussa). The phenolic accelerator component of the curing agent comprises about 0 to about 20 wt % of the curing agent, and is preferably about 5 to about 15 wt % of the curing agent.

The invention can be better understood by the following non-limiting examples. All formulation components are listed by weight % unless otherwise noted.

Example 1

Nine adhesive formulations were manufactured as follows. The individual materials were charged in the order given to a screw top polypropylene mixing cup and placed in the mixing cradle of a Flacktec DAC-150 Dual Assymmetric Centrifugue Mixer. The materials were then thoroughly mixed and degassed by running the mixer at a mixing speed of 2500 rpm for 30 seconds. The adhesives are listed in Table 1.

TABLE 1

Adhesives with Various Additives

|  | 1 | 2 | 3 | 4 | 5 | 6 | 7 | 8 | 9 |
|---|---|---|---|---|---|---|---|---|---|
| PY720 | 90 | 85 | 75 | 90 | 85 | 75 | 95 | 95 | 95 |
| TS720 | 5 | 5 | 5 | 5 | 5 | 5 | 5 | 5 | 5 |
| CN111 | 5 | 10 | 20 | — | — | — | — | — | — |
| SR508 | — | — | — | 5 | 10 | 20 | — | — | — |
| D230 | 100 | 100 | 100 | 100 | 100 | 100 | 92.24 | 87.38 | 77.67 |
| DMAPA | — | — | — | — | — | — | 2.91 | 2.91 | 2.91 |
| ATBN | — | — | — | — | — | — | 4.85 | 9.71 | 19.42 |
| Mix Ratio (Resin/Curing Agent) | 3:1 | 3:1 | 3:1 | 3:1 | 3:1 | 3:1 | 3:1 | 4:1 | 5:2 |

The invention also provides a method for bonding articles together which comprises mixing the resin and curing agent components of the adhesive together, applying the adhesive composition of the invention in a liquid or paste form to a first article, bringing a second article in contact with the composition applied to the first article, and subjecting the applied composition to conditions which will allow the composition to cure to a composition having an irreversible solid form. The composition is typically distributed and stored in its two separate components. Thus, this invention includes adhesive compositions in both its two separate components, as it is typically stored and distributed, and its final, combined form, after it has been mixed and just prior to its application.

After application, in order to adhere articles together, the adhesive composition is subjected to conditions that will allow it to solidify and cure to a composition that has an irreversible solid form. Solidification (setting) occurs when the two components are mixed together at room temperature.

As shown in Table 2, the ingredients of the curing agent portion of the adhesive affect the lap shear strength and peel strength of the adhesive.

TABLE 2

Strength of Adhesives with Various Additives

|  | 1 | 2 | 3 | 4 | 5 | 6 | 7 | 8 | 9 |
|---|---|---|---|---|---|---|---|---|---|
| Lap Shear Strength (Mpa) |  |  | 3 |  |  |  |  |  |  |
| Peel Strength N/25 mm | 52.5 | 76.4 | 232.8 | 41 | 91 | 200 | 17.3 | 47.3 | 71.9 |

Of these formulations shown in Table 2, only sample 3 provided sufficient peel strength. However, the lap shear strength for sample 3 was extremely low.

Example 2

Thirteen adhesive compositions were formulated using the method of Example 1. Various polyols were utilized in the resin component of each formulation, as shown in Table 3.

TABLE 3

Adhesive Formulations with Various Polyols

|  | 1 | 2 | 3 | 4 | 5 | 6 | 7 | 8 | 9 | 10 | 11 | 12 | 13 |
|---|---|---|---|---|---|---|---|---|---|---|---|---|---|
| PY720 | 90 | 85 | 75 | 90 | 85 | 75 | 90 | 85 | 75 | 90 | 85 | 75 | 75 |
| TS720 | 5 | 5 | 5 | 5 | 5 | 5 | 5 | 5 | 5 | 5 | 5 | 5 | 5 |

TABLE 3-continued

Adhesive Formulations with Various Polyols

| | 1 | 2 | 3 | 4 | 5 | 6 | 7 | 8 | 9 | 10 | 11 | 12 | 13 |
|---|---|---|---|---|---|---|---|---|---|---|---|---|---|
| STEPANPOL | 5 | 10 | 20 | — | — | — | — | — | — | — | — | — | — |
| HS100 | — | — | — | 5 | 10 | 20 | — | — | — | — | — | — | — |
| POLY BD600 | — | — | — | — | — | — | 5 | 10 | 20 | — | — | — | — |
| TERATHANE T1000 | — | — | — | — | — | — | — | — | — | 5 | 10 | 20 | — |
| POLY B0605 | — | — | — | — | — | — | — | — | — | — | — | — | 20 |
| DM230 | 100 | 100 | 100 | 100 | 100 | 100 | 100 | 100 | 100 | 100 | 100 | 100 | 100 |
| Mix Ratio | 3:1 | 3:1 | 3:1 | 7:2 | 7:2 | 4:1 | 13:4 | 7:2 | 15:4 | 3:1 | 7:2 | 4:1 | 7:2 |

The results of the strength tests on these formulations are illustrated in Table 4.

TABLE 4

Strength of Adhesives with Various Polyols

| | 1 | 2 | 3 | 4 | 5 | 6 | 7 | 8 | 9 | 10 | 11 | 12 | 13 |
|---|---|---|---|---|---|---|---|---|---|---|---|---|---|
| Lap Shear Strength Mpa | | | | 24.63 | 23.2 | 24.3 | 20.56 | 23.47 | 14.4 | | | | 18.9 |
| Peel Strength N/25 mm | 23.6 | 23 | 50.7 | 85.7 | 166.3 | 187.1 | 55.7 | 110.3 | 107.8 | 64 | 123.6 | 183 | |

As shown in Table 4, the different polyols provide different adhesive strengths. Certain polyols such as HS100 provide superior strength even in the absence of any additional polyols.

Example 3

Alternative amines were added to a standard resin component comprising 56.25% PY 720, polypropylene glycol diglycidyl ether (DER 736), styrene/butadiene core surrounded by acrylic/styrene shell (Paraloid EXL2600) and epoxy silane coated wollastonite filler (Nyad ES10). The amines utilized are shown in Table 5.

TABLE 5

Various Amines in Standard Resin

| | 1 | 2 | 3 | 4 | 5 | 6 | 7 |
|---|---|---|---|---|---|---|---|
| EUREDUR 70 | 100 | — | — | — | — | — | — |
| EUREDUR 75 | — | 100 | — | — | — | — | — |
| EUREDUR 140 | — | — | 100 | — | — | — | — |
| CRAYAMID 125 | — | — | — | 100 | — | — | — |
| EUREDUR 145 | — | — | — | — | 100 | — | — |
| EUREDUR 76 | — | — | — | — | — | 100 | — |
| D230 | — | — | — | — | — | — | 100 |

The peel and shear strengths for these adhesives containing the curing agent components of Table 5 are set out in Table 6.

TABLE 6

Adhesive Strength with Various Amines

| | 1 | 2 | 3 | 4 | 5 | 6 | 7 |
|---|---|---|---|---|---|---|---|
| Lap Shear Strength MPa | 2.7 | 13.8 | 23.5 | 26.9 | 13.7 | 16 | 12.4 |
| Peel Strength N/25 mm | 43 | 136.1 | 50.9 | 123.6 | 160 | 88.3 | 210 |

As shown in Table 6, the composition having the curing agent containing D230 provides the greatest peel strength, while a different formulation provides the greatest lap shear strength.

Example 4

To determine the optimum mixture of amine, a resin component containing 85% PY720 and 15% HS100 was combined with a curing agent comprising 10% K54, 10% ATBN, 10% 4,7,10-trioxatridecane-1, 13-diamine, and 70% of an amine. The amine combinations and the strengths of the resulting adhesives are illustrated in Table 7.

TABLE 7

Adhesives with a Combination of Amines

| | 1 | 2 | 3 | 4 | 5 | 6 | 7 | 8 | 9 |
|---|---|---|---|---|---|---|---|---|---|
| D230 | 100 | 95 | 85 | 70 | 50 | 30 | 15 | 5 | 0 |
| C125 | 0 | 5 | 15 | 30 | 50 | 70 | 85 | 95 | 100 |
| Lap Shear Strength Mpa | 23.04 | 26.2 | 26.8 | 27.9 | 25.4 | 25.6 | 24.4 | 26.3 | 26.3 |
| Peel Strength N/25 mm | 109 | 116 | 150 | 132 | 129 | 164 | 144 | 115 | 112 |

As illustrated. the best results for overall adhesive strength were produced by compositions 3 and 6.

Example 5

The level of tris(2,4,6-dimethylaminomethyl)phenol were varied in the resin composition of Example 4. The results are illustrated in Table 8.

TABLE 8

Adhesives having Various Phenol Levels

| | 1 | 2 | 3 | 4 |
|---|---|---|---|---|
| K54 | 5 | 10 | 15 | 20 |
| 4,7,10-trioxatridecane-1,13-diamine | 10 | 10 | 10 | 10 |
| ATBN | 10 | 10 | 10 | 10 |
| D230 | 37.5 | 37.5 | 32.5 | 30 |
| C125 | 37.5 | 37.5 | 32.5 | 30 |

The strengths of the adhesives formed are shown in Table 9.

TABLE 9

Adhesives Strengths Having Various Phenol Levels

| | 1 | 2 | 3 | 4 |
|---|---|---|---|---|
| Lap Shear Strength Mpa | 29 | 34.6 | 33.2 | 28.9 |
| Peel Strength N/25 mm | 153 | 154 | 150 | 182 |

Example 6

The resin components of Example 4 were also formulated with various amounts of ATBN. The formulations are illustrated in Table 10.

TABLE 10

Adhesive Compositions with Varying Levels of ATBN

| | 1 | 2 | 3 | 4 | 5 |
|---|---|---|---|---|---|
| K54 | 13 | 13 | 13 | 13 | 13 |
| 4,7,10-trioxatridecane-1,13-diamine | 5 | 5 | 5 | 5 | 5 |
| ATBN | 5 | 7.5 | 10 | 12.5 | 15 |
| D230 | 64.6 | 62.5 | 60.35 | 58.25 | 56.1 |
| C125 | 11.4 | 11 | 10.65 | 10.25 | 9.9 |

TABLE 10-continued

Adhesive Compositions with Varying Levels of ATBN

| | 1 | 2 | 3 | 4 | 5 |
|---|---|---|---|---|---|
| A1100 | 1 | 1 | 1 | 1 | 1 |

The results of the varying levels of ATBN are illustrated in Table 11.

TABLE 11

Strengths of Adhesives Containing Varying Levels of ATBN

| | 1 | 2 | 3 | 4 | 5 |
|---|---|---|---|---|---|
| Lap Shear Strength Mpa | 32.9 | 33.5 | 34.3 | 31.1 | 34.8 |
| Peel Strength N/25 mm | 101 | 110 | 125 | 140 | 145 |

As shown in Table 11, the formulation containing 15% ATBN provided the best combination of lap shear strength and peel strength.

Example 7

The resin of Example 4 was tested with a curing agent having varying amounts of silane as shown in Table 12.

TABLE 12

Adhesive Compositions with Varying Levels of Silane

| | 1 | 2 | 3 | 4 | 5 | 6 | 7 | 8 |
|---|---|---|---|---|---|---|---|---|
| K 54 | 12.99 | 13 | 13 | 13 | 13 | 12.99 | 12.99 | 12.99 |
| ATBN | 17.49 | 17.5 | 17.5 | 17.5 | 17.5 | 17.49 | 17.49 | 17.49 |
| D230 | 59.07 | 58.9 | 58.75 | 58.55 | 58.4 | 57.37 | 55.67 | 53.97 |
| C125 | 10.45 | 10.4 | 10.35 | 10.35 | 10.3 | 10.15 | 9.85 | 9.55 |
| A1100 | 0 | 0.2 | 0.4 | 0.6 | 0.8 | 2 | 4 | 6 |

The results of the varying levels of silane in the curing agent are illustrated in Table 13.

TABLE 13

Strengths of Adhesives Containing Varying Levels of Silane

| | 1 | 2 | 3 | 4 | 5 | 6 | 7 | 8 |
|---|---|---|---|---|---|---|---|---|
| Lap Shear Strength Mpa | 25.86 | 25.17 | 26.16 | 28.15 | 28.17 | 33 | 25.44 | 26.92 |
| Peel Strength N/25 mm | 143 | 140 | 165 | 144 | 135 | 198 | 183 | 182 |

From Table 13 it is clearly illustrated that the addition of silane improves the strength of the adhesive compositions.

I claim:

1. A two-part adhesive comprising a resin component and a curing agent component, wherein the resin component comprises an epoxy resin and a polyol and the curing agent component comprises a polyoxyalkyleneamine, an amine terminated butadiene-acrylonitrile polymer, silane, a polyamide resin, a phenolic accelerator, and, optionally, hydrophobic fumed silica.

2. An adhesive according to claim 1, wherein the epoxy resin is selected from the group consisting of 3,4-epoxycyclohexylmethyl-3,4-epoxycyclohexane carboxylate, vinylcyclohexene dioxide, 3,4-epoxy-6-methyl cyclohexyl methyl-3,4-epoxycyclohexane carboxylate, dicyclopentadiene dioxide, bisphenol A resin, 2,2-bis(4-hydroxyphenyl) propane-epichlorohydrin copolymer, bisphenol F type resin, epoxy novolac resin, poly(phenyl glycidyl ether)-co-formaldehyde, biphenyl type epoxy resin, dicyclopentadiene-phenol epoxy resins, naphthalene epoxy resins, epoxy functional butadiene acrylonitrile copolymers, epoxy functional polydimethyl siloxane, and mixtures thereof.

3. An adhesive according to claim 2, wherein the epoxy resin is selected from the group comprising bisphenol A type resin, bisphenol F type resin and mixtures thereof.

4. An adhesive according to claim 2, wherein the epoxy resin comprises in the range of from about 50 wt % to about 90 wt % of the resin component of the adhesive.

5. An adhesive according to claim 4, wherein the epoxy resin comprises in the range of from about 75 wt % to about 85 wt % of the resin component of the adhesive.

6. An adhesive according to claim 1, wherein the polyol is selected from the group comprising polyester polyols, polyether polyols, polymer polyols or mixtures thereof.

7. An adhesive according to claim 6, wherein the polyol is polyoxypropylene/polyoxyethylene non-reactive styrene acrylonitrile polymer polyol.

8. An adhesive according to claim 4, wherein the polyol comprises in the range of from about 10 wt % to about 40 wt % of the resin component of the adhesive.

9. An adhesive according to claim 8, wherein the polyol comprises in the range of from about 10 wt % to about 20 wt % of the resin component of the adhesive.

10. An adhesive according to claim 1, wherein the polyoxyalkyleneamine comprises in the range of from about 20 wt % to about 100 wt % of the curing agent component of the adhesive.

11. An adhesive according to claim 10, wherein the polyoxyalkyleneamine comprises in the range of from about 40 wt % to about 80 wt % of the curing agent component of the adhesive.

12. An adhesive according to claim 1, wherein the amine terminated butadiene-acrylonitrile polymer comprises in the range of from about 0 wt % to about 30 wt % of the curing agent component of the adhesive.

13. An adhesive according to claim 1, wherein the amine terminated butadiene-acrylonitrile polymer comprises in the range of from about 10 wt % to about 20 wt % of the curing agent component of the adhesive.

14. An adhesive according to claim 1, wherein the phenolic accelerator comprises tris(2,4,6-(dimethylaminomethyl)phenol.

15. An adhesive according to claim 1, wherein the polyamide resin is based on dimerised fatty acid.

16. An adhesive according to claim 1, wherein the silane is gamma-Aminopropyltriethoxy silane.

17. A two-part adhesive comprising a resin component and a curing agent component, wherein the resin component comprises an epoxy resin and a toughener and the curing agent component comprises a polyoxyalkyleneamine, an amine terminated butadiene-acrylonitrile polymer, silane, a polyamide resin, a phenolic accelerator, and, optionally, hydrophobic fumed silica.

18. An adhesive according to claim 17, wherein the toughener is an acrylate monomer.

19. An adhesive according to claim 18, wherein the acrylate monomer is selected from the group comprising epoxidized soya bean acrylate, dipropylene glycol diacrylate and mixtures thereof.

20. A method of bonding materials together which comprises applying the adhesive composition of claim 1 or 17 in a liquid or paste form to a first substrate, bringing a second substrate in contact with the composition applied to the first substrate, and subjecting the compositions to conditions which will allow the compositions to cure to an irreversible solid form.

21. An article of manufacture comprising the adhesive of claim 1 or claim 17.

* * * * *